US010316119B2

(12) United States Patent
Inatomi et al.

(10) Patent No.: US 10,316,119 B2
(45) Date of Patent: Jun. 11, 2019

(54) ULTRAHIGH MOLECULAR WEIGHT POLYETHYLENE PARTICLES AND MOLDED PRODUCT MADE THEREOF

(71) Applicant: TOSOH CORPORATION, Shunan-shi, Yamaguchi (JP)

(72) Inventors: Kei Inatomi, Mie (JP); Saiki Hasegawa, Mie (JP); Shigehiko Abe, Mie (JP)

(73) Assignee: TOSOH CORPORATION, Shunan (JP)

( * ) Notice: Subject to any disclaimer, the term of this patent is extended or adjusted under 35 U.S.C. 154(b) by 724 days.

(21) Appl. No.: 14/904,108

(22) PCT Filed: Jul. 7, 2014

(86) PCT No.: PCT/JP2014/068075
§ 371 (c)(1),
(2) Date: Jan. 11, 2016

(87) PCT Pub. No.: WO2015/005287
PCT Pub. Date: Jan. 15, 2015

(65) Prior Publication Data
US 2016/0152744 A1  Jun. 2, 2016

(30) Foreign Application Priority Data

Jul. 10, 2013  (JP) ................................ 2013-144940
Jun. 9, 2014  (JP) ................................ 2014-118459

(51) Int. Cl.
| | | |
|---|---|---|
| *C08F 10/02* | (2006.01) | |
| *C08F 110/02* | (2006.01) | |
| *C08F 210/16* | (2006.01) | |
| *C08F 4/659* | (2006.01) | |
| *C08F 4/6592* | (2006.01) | |

(52) U.S. Cl.
CPC ............ *C08F 110/02* (2013.01); *C08F 10/02* (2013.01); *C08F 210/16* (2013.01); *C08F 4/65912* (2013.01); *C08F 4/65927* (2013.01)

(58) Field of Classification Search
CPC ...... C08F 210/16; C08F 110/02; C08F 10/02; C08F 4/65912; C08F 4/65927; Y10T 428/2982
USPC ....................... 428/402; 526/348, 348.6, 352
See application file for complete search history.

(56) References Cited

U.S. PATENT DOCUMENTS

2008/0071031 A1* 3/2008 Fujiwara ............... C08F 10/00
525/195
2009/0324920 A1* 12/2009 Takeyama ............... B29C 55/04
428/220

FOREIGN PATENT DOCUMENTS

| EP | 2 036 942 | | 3/2009 |
|---|---|---|---|
| EP | 2 050 767 | | 4/2009 |
| JP | 60-158205 | * | 8/1985 |
| JP | 63-33403 | | 2/1988 |
| JP | 63-033403 | * | 2/1988 |
| JP | 5-070519 | * | 3/1993 |
| JP | 5-70519 | | 3/1993 |
| JP | 9-291112 | | 11/1997 |
| JP | 2006-36988 | | 2/2006 |
| JP | 2012-25817 | | 2/2012 |
| JP | 2012-025817 | * | 2/2012 |
| JP | 4868853 | | 2/2012 |
| JP | 2012-229417 | * | 11/2012 |
| WO | WO2006/070886 | * | 7/2006 |
| WO | WO 2006/070886 | | 7/2006 |
| WO | WO2008/001772 | * | 1/2008 |
| WO | WO 2008/001772 | | 1/2008 |
| WO | WO 2012/004683 | | 1/2012 |

OTHER PUBLICATIONS

International Search Report for PCT/JP2014/068075 dated Sep. 9, 2014, two pages.
Extended European Search Report issued in App. No. 14823263.0 dated Jan. 17, 2017.
International Preliminary Report on Patentability and Written Opinion of the International Searching Authority issued for International Patent Application No. PCT/JP2014/068075, 7 pages, dated Jan. 12, 2016.
Office Action issued in JP Appln. No. 2014-118459 dated Jul. 17, 2018 (w/ machine translation).

* cited by examiner

*Primary Examiner* — Leszek B Kiliman
(74) *Attorney, Agent, or Firm* — Nixon & Vanderhye P.C.

(57) ABSTRACT

To provide novel ultrahigh molecular weight polyethylene particles having a high melting point and exhibiting high crystallinity, thus capable of providing a molded product excellent in mechanical strength, thermal resistance and abrasion resistance.
Ultrahigh molecular weight polyethylene particles which satisfy that (1) the intrinsic viscosity ($\eta$) is at least 15 dL/g and at most 60 dL/g, (2) the bulk density is at least 130 kg/m$^3$ and at most 700 kg/m$^3$, and (3) $\Delta$Tm ($\Delta$Tm=Tm$_1$−Tm$_2$) i.e. the difference between a melting point (Tm$_1$) in 1st scan and a melting point (Tm$_2$) in 2nd scan, measured by a differential scanning calorimeter (DSC), is at least 11° C. and at most 30° C.

13 Claims, No Drawings

ULTRAHIGH MOLECULAR WEIGHT POLYETHYLENE PARTICLES AND MOLDED PRODUCT MADE THEREOF

This application is the U.S. national phase of International Application No. PCT/JP2014/068075 filed 7 Jul. 2014 which designated the U.S. and claims priority to JP Patent Application No. 2013-144940 filed 10 Jul. 2013 and JP Patent Application No. 2014-118459 filed 9 Jun. 2014, the entire contents of each of which are hereby incorporated by reference.

TECHNICAL FIELD

The present invention relates to ultrahigh molecular weight polyethylene particles having a high melting point and exhibiting high crystallinity, and a molded product obtained from such ultrahigh molecular weight polyethylene particles, more particularly to novel ultrahigh molecular weight polyethylene particles having a high melting point and exhibiting high crystallinity, thus capable of providing a molded product excellent in mechanical strength, thermal resistance and abrasion resistance.

BACKGROUND ART

Heretofore, ultrahigh molecular weight polyethylene has been known to be superior to general-purpose polyethylene in impact resistance, self-lubricating properties, abrasion resistance, sliding properties, weather resistance, chemical resistance, dimensional stability, etc. and to have physical properties comparable to engineering plastics. However, because of its high molecular weight, ultrahigh molecular weight polyethylene is poor in fluidity when melted, and is hardly moldable by kneading extrusion unlike usual polyethylene having a molecular weight within a range of from a few tens thousands to about 500,000. Therefore, ultrahigh molecular weight polyethylene is molded by a method of directly sintering a polymer powder obtained by polymerization, a method of compression molding, an extrusion molding method by means of a ram extruder to carry out extrusion molding while exerting compression intermittently, or a method of extrusion molding in a state dispersed in e.g. a solvent, followed by removing the solvent.

However, such molding methods have had a problem such that the technical level of difficulty is so high that it is difficult to obtain molded products, and further, due to the presence of locally highly viscous portions caused by entanglement of high molecular chains or due to deficiency in flowability of polymer particles, non-dense portions are likely to be formed to result in weak points, whereby it tends to be difficult to attain mechanical strength which the obtainable molded product is expected to have, and the mechanical strength tends to be relatively low.

On the other hand, as a means to increase the mechanical strength at the time of being formed into a molded product, ultrahigh molecular weight polyethylene having a narrow molecular weight distribution, using a metallocene catalyst, has been proposed (see e.g. Patent Documents 1 and 2).

PRIOR ART DOCUMENTS

Patent Documents

Patent Document 1: Japanese Patent No. 4,868,853
Patent Document 2: JP-A-2006-36988

DISCLOSURE OF INVENTION

Technical Problem

However, ultrahigh molecular weight polyethylene proposed in Patent Documents 1 and 2, has not yet been satisfactory with respect to strength, thermal resistance and crystallinity although some improvement in performance as a molded product has been observed.

Further, as the molecular weight increases, usual ultrahigh molecular weight polyethylene tends to be difficult to solve entanglement of its molecular chains one another, whereby it is not possible to adequately provide the desired effects expected by an increase of the molecular weight. For example, the tensile strength at break becomes maximum at a molecular weight of about 3,000,000, and if the molecular weight is made higher than that level, there has been a problem such that the tensile strength at break rather tends to decrease.

The present invention has been made in view of the above problem, and it is an object of the present invention to provide novel ultrahigh molecular weight polyethylene particles having a high melting point and specific melting behavior, thus capable of providing a molded product excellent in strength, thermal resistance, abrasion resistance, etc.

Solution to Problem

As a result of intensive studies to solve the above problem, the present inventors have found that novel ultrahigh molecular weight polyethylene particles having a high melting point and specific melting behavior, are capable of providing a molded product excellent in strength, thermal resistance, abrasion resistance, etc. and thus have arrived at the present invention.

That is, the present invention provides ultrahigh molecular weight polyethylene particles characterized by satisfying at least each of the characteristics shown in the following (1) to (3), and a molded product made thereof:

(1) the intrinsic viscosity ($\eta$) is at least 15 dL/g and at most 60 dL/g,
(2) the bulk density is at least 130 kg/m$^3$ and at most 700 kg/m$^3$,
(3) the difference between Tm$_1$ and Tm$_2$ (i.e. $\Delta$Tm=Tm$_1$-Tm$_2$) is at least 11° C. and at most 30° C., where Tm$_1$ is a melting point (Tm$_1$) in 1st scan measured by a differential scanning calorimeter (DSC) at the time when the temperature is raised from 0° C. to 230° C. at a temperature raising rate of 10° C./min (1st scan), and Tm$_2$ is a melting point (Tm$_2$) in 2nd scan measured by DSC at the time when, then, after being left to stand for 5 minutes, lowering the temperature to -20° C. at a temperature lowering rate of 10° C./min and then being left to stand for 5 minutes, the temperature is again raised from -20° C. to 230° C. at a temperature raising rate of 10° C./min (2nd scan).

Advantageous Effects of Invention

The ultrahigh molecular weight polyethylene particles of the present invention have a high melting point and exhibit high crystallinity, whereby a molded product obtained therefrom will be one excellent in mechanical strength, thermal resistance, abrasion resistance, etc. and having excellent properties as a base material for various industrial equipments, etc.

DESCRIPTION OF EMBODIMENTS

In the following, the present invention will be described in detail. In the following description including Examples, % means % by weight.

The ultrahigh molecular weight polyethylene particles of the present invention are ones wherein ultrahigh molecular weight polyethylene has a particle shape, and to the ultrahigh molecular weight polyethylene, those in a category referred to as polyethylene belong. For example, an ethylene homopolymer; an ethylene-α-olefin copolymer, such as an ethylene-propylene copolymer, an ethylene-1-butene copolymer, an ethylene-1-hexene copolymer or an ethylene-1-octene copolymer; etc. may be mentioned.

The ultrahigh molecular weight polyethylene particles of the present invention are characterized in that (1) the intrinsic viscosity (η) is at least 15 dL/g and at most 60 dL/g, particularly preferably at least 15 dL/g and at most 50 dL/g, since excellent moldability and mechanical properties will thereby be obtainable when made into a molded product. Here, if the intrinsic viscosity (η) is less than 15 dL/g, the obtainable molded product will be inferior in mechanical properties. On the other hand, if the intrinsic viscosity (η) exceeds 60 dL/g, the fluidity when melted will be low, whereby the moldability will be very poor.

The intrinsic viscosity (η) in the present invention can be measured, for example, by using an Ubbelohde viscometer, at 135° C. with respect to a solution having a polymer concentration of from 0.0005 to 0.01% using o-dichlorobenzene as a solvent.

Further, the ultrahigh molecular weight polyethylene particles of the present invention are characterized in that (2) the bulk density is at least 130 kg/m$^3$ and at most 700 kg/m$^3$, more preferably at least 200 kg/m$^3$ and at most 600 kg/m$^3$. Here, if the bulk density of the ultrahigh molecular weight polyethylene particles is less than 130 kg/m$^3$, a problem is more likely to occur such that the operation efficiency will be significantly deteriorated, as the flowability of the particles decreases, the packing rate in a storage container and hopper decreases, etc. On the other hand, if the bulk density exceeds 700 kg/m$^3$, in melting or dissolution in a solvent at the time of the molding, center portions of the particles are likely to remain in a non-molten state, thereby to deteriorate the appearance of a molded body and to cause a problem such as deterioration of the physical properties of the molded product.

The bulk density in the present invention can be measured, for example, by the method in accordance with JIS K6760 (1995).

Further, the ultrahigh molecular weight polyethylene particles of the present invention are characterized in that (3) the difference between $Tm_1$ and $Tm_2$ (i.e. $\Delta Tm = Tm_1 - Tm_2$) is at least 11° C. and at most 30° C., where $Tm_1$ is a melting point ($Tm_1$) in 1st scan measured by a differential scanning calorimeter (DSC) at the time when the temperature is raised from 0° C. to 230° C. at a temperature raising rate of 10° C./min (1st scan), and $Tm_2$ is a melting point ($Tm_2$) in 2nd scan measured by DSC at the time when, then, after being left to stand for 5 minutes, lowering the temperature to −20° C. at a temperature lowering rate of 10° C./min and then being left to stand for 5 minutes, the temperature is again raised from −20° C. to 230° C. at a temperature raising rate of 10° C./min (2nd scan). Particularly, $\Delta Tm$ is preferably at least 11° C. and at most 15° C., since the ultrahigh molecular weight polyethylene particles will thereby be excellent in balance of thermal resistance, mechanical strength, moldability, etc. Here, if $\Delta Tm$ is lower than 11° C., the obtainable ultrahigh molecular weight polyethylene particles tend to be inferior in thermal resistance, strength, etc. On the other hand, if $\Delta Tm$ exceeds 30° C., dissolution of the obtainable ultrahigh molecular weight polyethylene particles tends to be difficult when the particles are subjected to molding, whereby not only they become poor in moldability, but also the physical characteristics of an obtainable molded product will be inferior.

In usual polyethylene, as polyethylene having a high melting point, an ethylene homopolymer belonging to a high-density polyethylene, is known, but the melting point of such a high density polyethylene is low at a level of about 130 to 135° C.

Whereas, the ultrahigh molecular weight polyethylene particles of the present invention, are ones having a very high melting point (Tm), as compared with polyethylene known in the art, and, for example, in the case of an ethylene homopolymer, they have a very high melting point with $Tm_1$ exceeding 140° C.

It is considered that the ultrahigh molecular weight polyethylene particles of the present invention are highly crystallized such that the molecular chains of polyethylene are oriented, whereby the difference $\Delta Tm$ between the $Tm_1$ and $Tm_2$ when measured by a differential scanning calorimeter (DSC) becomes a very large difference of at least 11° C. and at most 30° C.

Further, the reason as to why the ultrahigh molecular weight polyethylene particles in the present invention have such a very high melting point ($Tm_1$) and $\Delta Tm$, is not clearly understood, but it is considered that they are influenced by e.g. the thermal history during the production of the ultrahigh molecular weight polyethylene particles.

The ultrahigh molecular weight polyethylene particles of the present invention are preferably ones having a small content of titanium, in order to prevent discoloration (yellowing) or oxidation deterioration caused by titanium and to make them ones having a good color tone and being excellent in weather resistance. Particularly, in (4), the content of titanium is preferably less than 0.2 ppm, more preferably at most 0.1 ppm. Here, the content of titanium can be obtained by measurement by e.g. a chemical titration method, an X-ray fluorescence spectrometer, an ICP emission spectrometry device, etc.

Further, since it will be possible to provide a tougher molded product, the ultrahigh molecular weight polyethylene particles of the present invention, are preferably such that, in (5), the tensile strength at break (TS (MPa)) of a sheet molded as cooled at a mold temperature lower by from 10 to 30° C. than the melting point ($Tm_2$) in 2nd scan measured by the above (3), after heat compression with a pressing pressure of 20 MPa at a pressing temperature 190° C., satisfies the following relational expression (a). Further, since it is possible to provide a tougher molded product excellent in mechanical strength, abrasion resistance, etc., they are more preferably ones satisfying the following relational expression (c).

$$TS \geq 1.35 \times Tm_2 - 130 \tag{a}$$

$$1.35 \times Tm_2 - 130 \leq TS \leq 2 \times Tm_2 - 175 \tag{c}$$

Here, the tensile strength at break of usual polyethylene is low at a level of 45 MPa even in the case of high density polyethylene which shows the highest tensile strength. Also, in the case of conventional ultrahigh molecular weight polyethylene, it is not possible to take advantage of its high molecular weight, and its tensile strength at break is at a level equivalent to usual polyethylene and does not exceed 50 MPa. Therefore, a method for increasing the strength has been adopted, for example, by orientation by roll forming at a high draw ratio.

Whereas, in the ultrahigh molecular weight polyethylene particles of the present invention, the polymer chains are intertwined properly, whereby even in a category of ultrahigh molecular weight polyethylene where the intrinsic viscosity (η) is in excess of 15 dL/g, and even when its molecular weight is made high, the tensile strength at break will not decrease, but rather shows a tendency to further increase.

The ultrahigh molecular weight polyethylene particles of the present invention become more excellent in strength when made into a molded product, and therefore, it belongs to a category of high density polyethylene, and the tensile strength as measured in the above (5), is preferably at least 40 MPa, more preferably at least 50 MPa.

The conditions for measuring the tensile strength at break in the present invention are not particularly limited, and for example, a method of measuring a test piece of strip-shape or dumbbell type having a thickness of from 0.1 to 5 mm and a width of from 1 to 50 mm, at a tensile speed of from 1 mm/min to 500 mm/min, may be mentioned.

Further, the ultrahigh molecular weight polyethylene particles of the present invention are preferably such that, as (6), the breaking strength (MTS (MPa)) at the time when a heat compression molded sheet is melt-drawn at a temperature higher by 20° C. than the melting point ($Tm_2$) in 2nd scan measured by the above (3), is at least 2 MPa, more preferably a least 3 MPa, as the content of low molecular weight components is relatively small, proper intertwining of high molecular chains becomes possible, and particularly the thermal resistance becomes excellent. The higher the breaking strength, the better, but it is usually at most 20 MPa.

Whereas, usual polyethylene having a molecular weight of at most 500,000, has a high fluidity at a temperature higher by 20° C. than the melting point (Tm), and a molded body will be deformed by its own weight and cannot be melt stretched. Whereas, a conventional ultrahigh molecular weight polyethylene was melt stretchable even at a temperature higher by 20° C. than the melting point (Tm), but due to the influence of low molecular weight components contained, no strain hardening took place and it tended to undergo breakage at a strength of about 1 MPa in a state where the stress was low, and it was inferior in thermal resistance.

The molding conditions for the heat compression molded sheet for use in the melt drawing are not particularly limited, and, for example, the molding is conducted under conditions of a pressing temperature of from 100 to 250° C. and a pressing pressure of from 5 to 50 MPa, and among them, particularly the heat compression molding method as described in the above (5) may be exemplified. Further, as the melt drawing method, a method of stretching a test piece of strip-shape or dumbbell type having a thickness 0.1 to 5 mm and a width of from 1 to 50 mm, at a tensile rate of from 1 to 500 mm/min may be exemplified.

Further, especially since they will be excellent in heat resistance, the ultrahigh molecular weight polyethylene particles of the present invention are preferably such that in (7), the breaking strength (MTS (MPa)) at the time of being melt-drawn, as measured in the above (6), and the intrinsic viscosity ($\eta$), satisfy the following relational expression (b), and in particular, as they are excellent also in melt drawability and moldability, they are preferably ones satisfying the following relationship (d).

$$MTS \geq 0.11 \times \eta \quad (b)$$

$$0.11 \times \eta \leq MTS \leq 0.32 \times \eta \quad (d)$$

Since they will be excellent in flowability as a powder and in moldability during molding, the ultrahigh molecular weight polyethylene particles of the present invention are preferably such that, as (8), the average particle diameter is from 1 to 1,000 μm, more preferably from 2 to 500 μm.

When the average particle diameter is at least 1 μm, it is possible to prevent fouling in the polymerization process or occurrence of flow failure in a hopper, etc. during the molding. When the average particle diameter is at most 1,000 μm, melting or dissolution in a solvent, of the ultrahigh molecular weight polyethylene particles at the time of the molding, is facilitated, whereby the moldability will be excellent and the physical properties of an obtainable molded article will be improved. Here, the average particle diameter can be measured, for example, by a method such as a sieving test method using standard sieves, as defined in JIS Z8801.

Since fusion bonding of particles one another at the time of the molding will be good, and an obtainable molded product will be excellent in thermal resistance, strength, etc., the ultrahigh molecular weight polyethylene particles of the present invention are preferably such that, as (9), the molecular weight distribution (Mw/Mn) represented by the ratio of the weight average molecular weight (Mw) to the number average molecular weight (Mn) is larger than 3 and less than 6, particularly preferably larger than 3 and less than 5. Here, the weight average molecular weight and number average molecular weight at that time, can be measured by e.g. gel permeation chromatography (referred to also as GPC).

The ultrahigh molecular weight polyethylene particles of the present invention may contain various known additives, as the case requires. For example, thermal resistant stabilizers such as tetrakis(methylene(3,5-di-t-butyl-4-hydroxy) hydrocinnamate)methane, distearyl thiodipropionate, etc.; weather resistant stabilizers such as bis(2,2',6,6'-tetramethyl-4-piperidine) sebacate, 2-(2-hydroxy-t-butyl-5-methylphenyl)-5-chlorobenzotriazole, etc., may be mentioned.

Further, as a colorant, an inorganic or organic dry colorant may be added. Further, a stearate such as calcium stearate known as e.g. a lubricant or hydrogen chloride absorber, may also be mentioned as suitable additive.

As the production method for the ultrahigh molecular weight polyethylene particles of the present invention, so long as the production of the ultrahigh molecular weight polyethylene particles of the present invention is possible, a method such as homopolymerization of ethylene or copolymerization of ethylene with another olefin using a polyethylene production catalyst, may be mentioned. As the α-olefin at that time, for example, propylene, 1-butene, 4-methyl-1-pentene, 1-hexene, 1-octene, etc. may be mentioned.

Further, as the polymerization method, for example, a solution polymerization method, a bulk polymerization method, a gas phase polymerization method, a slurry polymerization method, etc. may be mentioned. Among them, a slurry polymerization method is preferred, whereby it becomes possible to produce ultrahigh molecular weight polyethylene particles having particularly uniform particle shape, and to produce efficiently and constantly ultrahigh molecular weight polyethylene particles having a high melting point and high crystallinity and being capable of providing a molded product excellent in mechanical strength, thermal resistance, abrasion resistance, etc. Further, the solvent to be used in the slurry polymerization, may be any solvent so long as it is an organic solvent to be commonly used, and, for example, benzene, toluene, xylene, pentane, hexane, heptane, etc. may be mentioned, or a liquefied gas such as isobutane or propane, or an olefin such as propylene, 1-butene, 1-octene, or 1-hexene, may also be used as the solvent.

Further, as the polyethylene production catalyst to be used for producing the ultrahigh molecular weight polyethylene particles of the present invention, any catalyst may be employed so long as the production of the ultrahigh molecular weight polyethylene particles is thereby possible. For example, a metallocene catalyst obtainable from a transition metal compound (A), an organically modified clay (B) modified with an aliphatic salt, and an organoaluminum compound (C), may be mentioned.

The transition metal compound (A) may, for example, be a transition metal compound having a (substituted) cyclopentadienyl group and a (substituted) fluorenyl group, a transition metal compound having a (substituted) a cyclopentadienyl group and a (substituted) indenyl group, a transition metal compound having a (substituted) indenyl group and a (substituted) fluorenyl group, etc. The transition metal at that time may, for example, be zirconium, hafnium or the like. Among them, since it will be possible to efficiently produce the ultrahigh molecular weight polyethylene particles of the present invention, a zirconium compound having a (substituted) cyclopentadienyl group and an amino group-substituted fluorenyl group, or a hafnium compound having a (substituted) cyclopentadienyl group and an amino group-substituted fluorenyl group, is preferred.

Specific examples of the transition metal compound (A) may, for example, be zirconium compounds, such as diphenylmethylene(1-indenyl)(9-fluorenyl)zirconium dichloride, diphenylmethylene(1-indenyl)(2,7-di-t-butyl-9-fluorenyl) zirconium dichloride, diphenylmethylene(4-phenyl-1-indenyl)(2,7-di-t-butyl-9-fluorenyl)zirconium dichloride, diphenyl silane diyl(cyclopentadienyl)(2-(dimethylamino)-9-fluorenyl)zirconium dichloride, diphenyl silane diyl (cyclopentadienyl)(2-(diethylamino)-9-fluorenyl)zirconium dichloride, diphenyl silane diyl(cyclopentadienyl)(2-(di-benzylamino)-9-fluorenyl)zirconium dichloride, diphenyl silane diyl(cyclopentadienyl)(2,7-bis(dimethylamino)-9-fluorenyl)zirconium dichloride, diphenyl silane diyl(cyclopentadienyl)(2,7-bis (diethylamino)-9-fluorenyl)zirconium dichloride, diphenyl silane diyl(cyclopentadienyl)(2,7-bis (di-benzylamino)-9-fluorenyl)zirconium dichloride, diphenyl silane diyl(cyclopentadienyl)(4-(dimethylamino)-9-fluorenyl)zirconium dichloride, diphenyl silane diyl (cyclopentadienyl)(4-(diethylamino)-9-fluorenyl)zirconium dichloride, diphenyl silane diyl(cyclopentadienyl)(4-(di-benzylamino)-9-fluorenyl)zirconium dichloride, diphenylmethylene(cyclopentadienyl)(2-(dimethylamino)-9-fluorenyl) zirconium dichloride, diphenylmethylene(cyclopentadienyl) (2-(diethylamino)-9-fluorenyl)zirconium dichloride, diphenylmethylene(cyclopentadienyl)(2-(di-benzylamino)-9-fluorenyl)zirconium dichloride, diphenylmethylene(cyclopentadienyl)(2,7-bis(dimethylamino)-9-fluorenyl)zirconium dichloride, diphenylmethylene(cyclopentadienyl)(2,7-bis(diethylamino)-9-fluorenyl)zirconium dichloride, diphenylmethylene(cyclopentadienyl)(2,7-bis(di-benzylamino)-9-fluorenyl)zirconium dichloride, diphenylmethylene(cyclopentadienyl)(4-(dimethylamino)-9-fluorenyl)zirconium dichloride, diphenylmethylene(cyclopentadienyl) (4-(diethylamino)-9-fluorenyl)zirconium dichloride, diphenylmethylene(cyclopentadienyl)(4-(di-benzylamino)-9-fluorenyl)zirconium dichloride, diphenylmethylene(cyclopentadienyl) (2,7-bis(dimethylamino)-9-fluorenyl)zirconium dichloride, diphenylmethylene(cyclopentadienyl)(2,7-bis(diethylamino)-9-fluorenyl)zirconium dichloride, diphenylmethylene(cyclopentadienyl)(2,7-bis(diisopropylamino)-9-fluorenyl)zirconium dichloride, diphenylmethylene(cyclopentadienyl)(2,7-bis(di-n-butyl-amino)-9-fluorenyl)zirconium dichloride, diphenylmethylene(cyclopentadienyl)(2,7-bis (di-benzylamino)-9-fluorenyl) zirconium dichloride, diphenylmethylene(cyclopentadienyl) (3,6-bis(dimethylamino)-9-fluorenyl)zirconium dichloride, diphenylmethylene(cyclopentadienyl)(3,6-bis(diethylamino)-9-fluorenyl)zirconium dichloride, diphenylmethylene(cyclopentadienyl)(3,6-bis(di-n-propyl-amino)-9-fluorenyl)zirconium dichloride, diphenylmethylene (cyclopentadienyl)(2,5-bis (dimethylamino)-9-fluorenyl) zirconium dichloride, diphenylmethylene(cyclopentadienyl) (2,5-bis(diethylamino)-9-fluorenyl)zirconium dichloride, diphenylmethylene(cyclopentadienyl)(2,5-bis-(diisopropylamino)-9-fluorenyl)zirconium dichloride, etc.; zirconium compounds having these dichloro substances changed to dimethyl substances, diethyl substances, dihydro substances, diphenyl substances or dibenzyl substances; hafnium compounds having zirconium in these compounds changed to hafnium; etc.

The organically modified clay (B) modified with an aliphatic salt may, for example, be a clay modified with an aliphatic salt, e.g. an aliphatic amine salt such as N,N-dimethyl-behenylamine hydrochloride, N-methyl-N-ethyl-behenylamine hydrochloride, N-methyl-N-n-propyl-behenylamine hydrochloride, N,N-dioleyl-methylamine hydrochloride, N,N-dimethyl-behenylamine hydrofluoride, N-methyl-N-ethyl-behenylamine hydrofluoride, N-methyl-N-n-propyl-behenylamine hydrofluoride, N,N-dioleyl-methylamine hydrofluoride, N,N-dimethyl-behenylamine hydrobromide, N-methyl-N-ethyl-behenylamine hydrobromide, N-methyl-N-n-propyl-behenylamine hydrobromide, N,N-dioleyl-methylamine hydrobromide, N,N-dimethyl-behenylamine hydroiodide, N-methyl-N-ethyl-behenylamine hydroiodide, N-methyl-N-n-propyl-behenylamine hydroiodide, N,N-dioleyl-methylamine hydroiodide, N,N-dimethyl-behenylamine sulfate, N-methyl-N-ethyl-behenylamine sulfate, N-methyl-N-n-propyl-behenylamine sulfate, or N,N-dioleyl-methylamine sulfate; or an aliphatic phosphonium salt such as P,P-dimethyl-behenyl phosphine hydrochloride, P,P-diethyl-behenyl phosphine hydrochloride, P,P-dipropyl-behenyl phosphine hydrochloride, P,P-dimethyl-behenyl phosphine hydrofluoride, P,P-diethyl-behenyl phosphine hydrofluoride, P,P-dipropyl-behenyl phosphine hydrofluoride, P,P-dimethyl-behenyl phosphine hydrobromide, P,P-diethyl-behenyl phosphine hydrobromide, P,P-dipropyl-behenyl phosphine hydrobromide, P,P-dimethyl-behenyl phosphine hydroiodide, P,P-diethyl-behenyl phosphine hydroiodide, P,P-dipropyl-behenyl phosphine hydroiodide, P,P-dimethyl-behenyl phosphine sulfate, P,P-diethyl-behenyl phosphine sulfate or P,P-dipropyl-behenyl phosphine sulfate.

Further, the clay compound constituting the organically modified clay (B) may be any one so long as it belongs to the category of clay compounds. A commonly known is one formed by a plurality of stacked layers so-called silicate layers each constituted by combination of a tetrahedral sheet made of silica tetrahedra which are continuous in two-dimensions and an octahedral sheet made of alumina octahedral, magnesia octahedral, etc. which are continuous in two-dimensions, in a ratio of 1:1 or 2:1, wherein some Si in the silica tetrahedra are isomorphously substituted by Al, some Al in the alumina octahedra are isomorphously substituted by Mg, and some Mg in the magnesia octahedra are isomorphously substituted by Li, etc., so that a positive charge inside of the layer becomes deficient, and the layers as a whole have a negative charge, and in order to compensate for the negative charge, cations such as $Na^+$, $Ca^{2+}$, etc. are present between the adjacent layers.

As such a clay compound, kaolinite, talc, smectite, vermiculite, mica, brittle mica, edge mud stone or the like, as a natural product or synthetic product, may be mentioned, and it is preferred to use them. Among them, smectite is preferred, since it is readily available, and it can easily be organically modified. Among smectite, hectorite or montmorillonite is more preferred.

The organically modified clay (B) can be obtained by introducing an aliphatic salt between the layers in the clay compound to form an ionic complex. At the time of preparing the organically modified clay (B), it is preferred to carry out the treatment by selecting the conditions so that the concentration of the clay compound would be from 0.1 to 30 wt %, and the treatment temperature would be from 0 to 150° C. The aliphatic salt may be prepared as a solid, so that it may be used as dissolved in a solvent, or a solution of the aliphatic salt may be prepared by a chemical reaction in a solvent, so that it may be used as it is.

With respect to the ratio in amounts of the clay compound and an aliphatic salt to be reacted, it is preferred to use an aliphatic salt in an amount of at least equivalent to exchangeable cations in the clay compound.

As the treatment solvent, for example, an aliphatic hydrocarbon such as pentane, hexane or heptane; an aromatic hydrocarbon such as benzene or toluene; an alcohol such as ethyl alcohol or methyl alcohol; an ether such as ethyl ether or n-butyl ether; a halogenated hydrocarbon such as methylene chloride or chloroform; acetone; 1,4-dioxane; tetrahydrofuran; water; or the like, may be used. Preferably, an alcohol or water is used alone or as one component of the solvent.

The particle diameter of the organically modified clay (B) that constitutes the polyethylene production catalyst, is not particularly limited, but from the viewpoint of the efficiency at the time of catalyst preparation and excellent efficiency in the polyethylene production, its median diameter is preferably from 1 to 100 μm, more preferably from 1 to 50 μm. The method for adjusting the particle diameter is not particularly limited. Large particles may be pulverized to an appropriate particle diameter; small particles may be granulated to an appropriate particle diameter; or pulverization and granulation may be combined to obtain a preferred particle diameter. Further, such adjustment of the particle diameter may be applied to a clay before organical modification or to an organically modified clay after such modification.

The organoaluminum compound (C) may be any one so long as it belongs to the category of organoaluminum compounds, and, for example, an alkyl aluminum such as trimethylaluminum, triethylaluminum or triisobutylaluminum, may be mentioned.

The proportions of the transition metal compound (A) (hereinafter sometimes referred to as component (A)), the organically modified clay (B) (hereinafter sometimes referred to component (B)) and the organoaluminum compound (C) (hereinafter sometimes referred to as component (C)) to be used to constitute the polyethylene production catalyst, are not particularly limited, so long as use as the polyethylene production catalyst is possible. Particularly, as a polyethylene production catalyst capable of producing the ultrahigh molecular weight polyethylene particles with good production efficiency, the molar ratio per metal atoms of component (A) to component (C) is preferably within a range of (component A):(component C)=from 100:1 to 1:100,000, particularly preferably in the range of from 1:1 to 1:10,000. Further, the weight ratio of component (A) to component (B) is preferably within a range of (component A):(component B)=from 10:1 to 1:10,000, particularly preferably within a range of from 3:1 to 1:1,000.

As the method for preparing the polyethylene production catalyst, any method may be employed so long as it is thereby possible to prepare the polyethylene production catalyst comprising at least component (A), component (B) and component (C). For example, a method may be mentioned wherein component (A), component (B) and component (C) are mixed and reacted in an inert solvent or by using as a solvent a monomer for polymerization, to obtain the catalyst in the form of a suspension.

There is no limitation with respect to the order of reacting these components, and there is no limitation also with respect to the temperature, treating time, etc. for carrying out the reaction treatment.

The polyethylene production catalyst of the present invention may be prepared by using two or more types of each of component (A), component (B) and component (C).

The polymerization conditions such as the polymerization temperature, polymerization time, polymerization pressure, monomer concentration, etc. at the time of producing the ultrahigh molecular weight polyethylene particles of the present invention, may be optionally selected. Particularly, it is preferred to carry out the polymerization at a polymerization temperature of from 0 to 100° C. for a polymerization time of from 10 seconds to 20 hours under a polymerization pressure within a range of from normal pressure to 100 MPa. Particularly preferably, the polymerization temperature is from 30 to 100° C., the polymerization time is from 60 seconds to 20 hours, and the polymerization pressure is from 0.1 to 1,000 MPa.

Further, it is also possible to carry out adjustment of the molecular weight by using e.g. hydrogen in the polymerization.

The polymerization may be carried out by any one of batch, semi-continuous and continuous systems, and may be carried out dividedly in two or more stages by changing the polymerization conditions.

Further, the polyethylene particles obtainable after completion of the polymerization, may be separated and recovered from the polymerization solvent and obtained by drying by conventional known methods.

A molded product made of the ultrahigh molecular weight polyethylene particles of the present invention may be obtained by a known molding method. Specifically, methods including extrusion molding such as ram extrusion, compression molding, powder coating, sheet molding, roll molding, stretch forming in a state as dissolved or mixed in various solvents, etc. may be exemplified.

EXAMPLES

Now, the present invention will be described in further detail with reference to Examples, but it should be understood that the present invention is by no means limited by these Examples. Unless otherwise noted, reagents, etc. used here are commercial products or products synthesized in accordance with known methods.

For pulverization of an organically modified clay, a jet mill (manufactured by Seishin Enterprise Co., (trade name) CO-JET SYSTEM α MARK III) was used, and the median diameter after the pulverization was measured by means of a microtrac particle size distribution analyzer (manufactured by Nikkiso Co., Ltd., (trade name) MT3000) using ethanol as a dispersing agent.

Preparation of a polyethylene production catalyst, preparation of polyethylene and purification of a solvent were all carried out in an inert gas (nitrogen gas) atmosphere. As a hexane solution (20 wt %) of triisobutylaluminum, one manufactured by Tosoh Finechem Corp. was used.

Further, various physical properties of the ultrahigh molecular weight polyethylene particles in Examples were measured by the following methods.

"Measurement of Intrinsic Viscosity"

Measured by using a Ubbelohde viscometer and ODCB (ortho-dichlorobenzene) as a solvent at 135° C. at an ultrahigh molecular weight polyethylene concentration of 0.005%.

"Measurement of Weight Average Molecular Weight and Number Average Molecular Weight"

The weight average molecular weight (Mw) and number-average molecular weight (Mn) were measured by PC, and from the obtained values of the weight-average molecular weight and number-average molecular weight, the molecular weight distribution (Mw/Mn) was obtained.

Using a GPC apparatus (Senshu Scientific Co., Ltd., (trade name) SSC-7110)) and columns ((manufactured by Tosoh Corporation, (trade name) TSKguardcolumnHHR (S) HT×1 pcs), and (manufactured by Tosoh Corporation, (trade name) TSKgelGMH$_{HR}$-H (S) HT×2 pieces)), the measurements were made by setting the column temperature to be 210° C. and using 1-chloronaphthalene as an eluent. The sample for measurement was prepared at a concentration of 0.5 mg/ml, and 0.2 ml was injected for the measurement. A calibration curve of the molecular weight was calibrated using known molecular weight polystyrene samples. The molecular weight was obtained as calculated as a molecular weight of polyethylene by using a Q-factor.

"Measurement of Bulk Density"

Measured by a method in accordance with JIS K6760 (1995).

"Measurement of $Tm_1$ and $Tm_2$"

Using a differential scanning calorimeter (DSC) (manufactured by SII Nano Technology Inc., (trade name) DSC6220), the temperature was raised from 0° C. to 230° C. at a temperature raising rate of 10° C./min (1st scan), whereby the crystal melting peak ($Tm_1$) in 1st scan was measured. Then, after being left to stand for 5 minutes, the temperature was lowered to −20° C. at a temperature lowering rate of 10° C./min, and after being left to stand for 5 minutes, the temperature was raised again from −20° C. to 230° C. at a temperature raising rate of 10° C./min (2nd scan), whereby the crystal melting peak ($Tm_2$) in 2nd scan was measured. The sample amount of ultrahigh molecular weight polyethylene at that time was set to be 6 mg.

"Measurement of Titanium Content"

Ultrahigh molecular weight polyethylene particles were incinerated and subjected to alkali fusion to prepare a solution, and using the solution, the titanium content in the ultrahigh molecular weight polyethylene particles was measured by an ICP emission spectrometer (manufactured by Perkin Elmer, (trade name) Optima3000XL). Here, the content at the measurement detection limit or less was evaluated as 0 ppm.

"Measurement of Tensile Strength at Break"

Ultrahigh molecular weight polyethylene particles were sandwiched between polyethylene terephthalate films and preheated at 190° C. for 5 minutes, and then heat-compressed under conditions of 190° C. and a pressing pressure of 20 MPa. Then, the heat-compressed product was cooled for 10 minutes at a mold temperature of 110° C., to obtain a pressed sheet having a thickness of 0.3 mm.

A sample (width at the measuring portion: 5 mm) was cut out in a dumbbell-shape from the sheet and left to stand for 48 hours at 23° C., and then, a tensile test was conducted by a tensile tester (manufactured by A&D Company, Limited, (trade name) Tensilon RTG-1210) at a measuring temperature of 23° C., with an initial length of the test piece being 20 mm and at a tensile rate of 20 mm/min, to obtain the tensile strength at break.

"Measurement of Breaking Stress at the Time of Melt Drawing"

A pressed sheet was obtained by the method described above in the measurement of tensile strength at break.

A sample (width at the measuring portion: 10 mm) was cut out in a dumbbell-shape from the sheet and left to stand for 48 hours at 23° C., and a tensile test was conducted by a tensile tester (A&D Company, Limited, (trade name) Tensilon UMT2.5T) at a temperature higher by 20° C. than the crystal melting peak ($Tm_2$) in 2nd scan by the differential scanning calorimeter (DSC), with an initial length of the test piece being 10 mm, at a tensile rate of 20 mm/min, to obtain the breaking stress at the time of the melt drawing. In a case where strain hardening occurs and the stress increases along with the drawing, the maximum value is taken as the breaking stress, and in a case no such strain hardening occurs and the stress does not increase even if drawn, the breaking stress at the flat area after yielding is taken as the breaking stress.

"Measurement of Average Particle Diameter"

Using nine sieves as defined in JIS Z8801 (opening: 710 μm, 500 μm, 425 μm, 300 μm, 212 μm, 150 μm, 106 μm, 75 μm and 53 μm), 100 g of ultrahigh molecular weight polyethylene particles were classified, and the weights of particles remaining on the respective sieves, thereby obtained, were integrated from the larger opening side to obtain an integral curve, in which the particle diameter at 50% by weight was measured to obtain the average particle diameter.

"Evaluation of Abrasion Resistance"

200 g of ultrahigh molecular weight polyethylene particles were put in a mold and press-molded for 20 minutes at a mold temperature of 190° C. under a face pressure of 30 MPa, to obtain a plate-shaped molded product of 150 mm in length and width and 10 mm in thickness.

The plate-shaped molded product was cutting-processed by a planing machine to prepare a round bar of 5 mm in diameter and 8 mm in height as a test sample, and using a friction and abrasion testing machine (manufactured by Orientec Co., Ltd., Model EFM-III-EN), the abrasion amount was measured in accordance with JIS K7218, under the conditions of a speed of 2.0 m/sec, a load of 25 MPa, a time of 360 min and an opponent material being SS400. The smaller the abrasion amount, the better the abrasion resistance.

Example 1

(1) Preparation of Organically Modified Clay

Into a 1-liter flask, 300 ml of industrial alcohol (manufactured by Japan Alcohol Trading Co., Ltd., (trade name) Ekinen F-3) and 300 ml of distilled water were put, then 15.0 g of concentrated hydrochloric acid and 64.2 g (120 mmol) of dioleylmethylamine (manufactured by Lion Corporation, (trade name) Armin M20) were added and heated to 45° C., and 100 g of synthetic hectorite (manufactured by Rockwood Additives Ltd., (trade name) Laponite RDS) was dispersed, whereupon the temperature was raised to 60° C., and the mixture was stirred for 1 hour while maintaining the temperature. The slurry was filtered and then washed twice with 600 ml of water at 60° C., followed by drying in a dryer of 85° C. for 12 hours, to obtain 160 g of an organically modified clay. This organically modified clay was pulverized by a jet mill to bring the median diameter to be 7 μm.
(2) Preparation of Suspension of Polyethylene Production Catalyst A 300 ml flask equipped with a thermometer and a reflux tube, was flushed with nitrogen, then 25.0 g of the organically modified clay obtained in the above (1) and 108 ml of hexane were put therein. Then, 0.795 g of diphenylmethylene(4-phenyl-1-indenyl)(2,7-di-t-butyl-9-fluorenyl)zirconium dichloride and 142 ml of 20% triisobutylaluminum were added, followed by stirring at 60° C. for 3 hours. After cooling to 45° C., the supernatant was decanted, followed by washing twice with 200 ml of hexane, and then, 200 ml of hexane was added to obtain a suspension of the polyethylene production catalyst (solid content: 11.7%).
(3) Production of Ultrahigh Molecular Weight Polyethylene Particles Into a 2-liter autoclave, 1.2 liters of hexane, 1.0 ml of 20% triisobutylaluminum and 356 mg (corresponding to 41.7 mg of solid content) of the suspension of the polyethylene production catalyst obtained in the above (2) were added and heated to 40° C., and then, ethylene was continuously supplied so that the partial pressure became 1.6 MPa, thereby to carry out slurry polymerization of ethylene. Upon expiration of 180 minutes, the pressure was released, and the slurry was filtered, followed by drying to obtain 37.1 g of ultrahigh molecular weight ethylene homopolymer particles (activity: 890 g/g catalyst). The physical properties of the obtained ultrahigh molecular weight ethylene homopolymer particles are shown in Table 1. Here, the "activity" means the yield (g) of the ultrahigh molecular weight polyethylene per 1 g of the catalyst.

Example 2

(1) Preparation of Organically Modified Clay and
(2) Preparation of Suspension of Polyethylene Production Catalyst were Carried out in the Same Manner as in Example 1.
(3) Production of Ultrahigh Molecular Weight Polyethylene Particles Into a 2-liter autoclave, 1.2 liters of hexane, 1.0 ml of 20% triisobutylaluminum and 326 mg (corresponding to 38.2 mg of solid content) of the suspension of the polyethylene production catalyst obtained in the above (2) were added and heated to 30° C., then 5 g of propylene was added, and ethylene was continuously supplied so that the partial pressure became 1.6 MPa, thereby to carry out slurry polymerization. Upon expiration of 180 minutes, the pressure was released, and the slurry was filtered, followed by drying to obtain 35.1 g of ultrahigh molecular weight ethylene-propylene copolymer particles (activity: 920 g/g catalyst). The physical properties of the obtained ultrahigh molecular weight ethylene-propylene copolymer particles are shown in Table 1.

Example 3

(1) Preparation of Organically Modified Clay
Carried out in the Same Manner as in Example 1.
(2) Preparation of Suspension of Polyethylene Production Catalyst A 300 ml flask equipped with a thermometer and a reflux tube, was flushed with nitrogen, and then 25.0 g of the organically modified clay obtained in the above (1) and 108 ml of hexane were put therein. Then, 0.600 g of diphenylmethylene(cyclopentadienyl)(2-(dimethylamino)-9-fluorenyl)zirconium dichloride, and 142 ml of 20% triisobutylaluminum were added, followed by stirring at 60° C. for 3 hours. After cooling to 45° C., the supernatant was decanted, followed by washing twice with 200 ml of hexane, and then, 200 ml of hexane was added to obtain a suspension of the polyethylene production catalyst (solid content: 11.5%).
(3) Production of Ultrahigh Molecular Weight Polyethylene Particles Into a 2-liter autoclave, 1.2 liters of hexane, 1.0 ml of 20% triisobutylaluminum and 236 mg (corresponding to 27.1 mg of solid content) of the suspension of the polyethylene production catalyst obtained in the above (2) were added and heated to 50° C., and then, ethylene was continuously supplied so that the partial pressure became 1.1 MPa, thereby to carry out slurry polymerization of ethylene. Upon expiration of 180 minutes, the pressure was released, and the slurry was filtered, followed by drying to obtain 152 g of ultrahigh molecular weight ethylene homopolymer particles (activity: 5,600 g/g catalyst). The physical properties of the obtained ultrahigh molecular weight ethylene homopolymer particles are shown in Table 1.

Example 4

(1) Preparation of Organically Modified Clay and
(2) Preparation of Suspension of Polyethylene Production Catalyst were Carried Out in the Same Manner as in Example 3.
(3) Production of Ultrahigh Molecular Weight Polyethylene Particles Into a 2-liter autoclave, 1.2 liters of hexane, 1.0 ml of 20% triisobutylaluminum and 89.9 mg (corresponding to 10.3 mg of solid content) of the suspension of the polyethylene production catalyst obtained in the above (2) were added and heated to 50° C., then 2 g of 1-butene was added, and ethylene was continuously supplied so that the partial pressure became 1.1 MPa, thereby to carry out slurry polymerization. Upon expiration of 180 minutes, the pressure was released, and the slurry was filtered, followed by drying to obtain 64.1 g of ultrahigh molecular weight ethylene-butene-1 copolymer particles (activity: 6,200 g/g catalyst). The physical properties of the obtained ultrahigh molecular weight ethylene-butene-1 copolymer particles are shown in Table 1.

Example 5

(1) Preparation of Organically Modified Clay and
(2) Preparation of Suspension of Polyethylene Production Catalyst were Carried out in the Same Manner as in Example 3.
(3) Production of Ultrahigh Molecular Weight Polyethylene Particles Into a 2-liter autoclave, 1.2 liters of hexane, 1.0 ml of 20% triisobutylaluminum and 352.4 mg (corresponding to 40.5 mg of solid content) of the suspension of the polyethylene production catalyst obtained in the above (2) were added and heated to 30° C., then 20 g of propylene was added, and ethylene was continuously supplied so that the partial pressure became 1.6 MPa, thereby to carry out slurry polymerization. Upon expiration of 180 minutes, the pressure was released, and the slurry was filtered, followed by drying to obtain 85.1 g of ultrahigh molecular weight ethylene-propylene copolymer particles (activity: 2,100 g/g catalyst).

The physical properties of the obtained ultrahigh molecular weight ethylene-propylene copolymer particles are shown in Table 1.

Example 6

(1) Preparation of Organically Modified Clay

Into a 1-liter flask, 300 ml of industrial alcohol (manufactured by Japan Alcohol Trading Co., Ltd., (trade name) Ekinen F-3) and 300 ml of distilled water were put, then 15.0 g of concentrated hydrochloric acid and 42.4 g (120 mmol) of dimethylbehenylamine (manufactured by Lion Corporation, (trade name) Armin DM22D) were added and heated to 45° C., and 100 g of synthetic hectorite (manufactured by Rockwood Additives Ltd., (trade name) Laponite RDS) was dispersed, whereupon the temperature was raised to 60° C., and the mixture was stirred for 1 hour while maintaining the temperature. The slurry was filtered and then washed twice with 600 ml of water at 60° C., followed by drying in a dryer of 85° C. for 12 hours, to obtain 125 g of an organically modified clay. This organically modified clay was pulverized by a jet mill to bring the median diameter to be 7 μm.

(2) Preparation of Suspension of Polyethylene Production Catalyst

A 300 ml flask equipped with a thermometer and a reflux tube, was flushed with nitrogen, and then 25.0 g of the organically modified clay obtained in the above (1) and 108 ml of hexane were put therein. Then, 0.715 g of diphenylmethylene(cyclopentadienyl)(2-(diethylamino)-9-fluorenyl) hafnium dichloride and 142 ml of 20% triisobutylaluminum were added, followed by stirring at 60° C. for 3 hours. After cooling to 45° C., the supernatant was decanted, followed by washing twice with 200 ml of hexane, and then, 200 ml of hexane was added to obtain a suspension of the polyethylene production catalyst (solid content: 12.9%).

(3) Production of Ultrahigh Molecular Weight Polyethylene Particles

Into a 2-liter autoclave, 1.2 liters of hexane, 1.0 ml of 20% triisobutylaluminum and 108.7 mg (corresponding to 14.0 mg of solid content) of the suspension of the polyethylene production catalyst obtained in the above (2) were added and heated to 60° C., and then, ethylene was continuously supplied so that the partial pressure became 1.3 MPa, thereby to carry out slurry polymerization of ethylene. Upon expiration of 180 minutes, the pressure was released, and the slurry was filtered, followed by drying to obtain 115 g of ultrahigh molecular weight ethylene homopolymer particles (activity: 8,200 g/g catalyst). The physical properties of the obtained ultrahigh molecular weight ethylene homopolymer particles are shown in Table 1.

Example 7

(1) Preparation of Organically Modified Clay and
(2) Preparation of Suspension of Polyethylene Production Catalyst were Carried out in the Same Manner as in Example 6.

(3) Production of ultrahigh molecular weight polyethylene particles

Into a 2-liter autoclave, 1.2 liters of hexane, 1.0 ml of 20% triisobutylaluminum and 85.4 mg (corresponding to 11.0 mg of solid content) of the suspension of the polyethylene production catalyst obtained in (2) were added and heated to 60° C., then 5 g of propylene was added, and ethylene was continuously supplied so that the partial pressure became 1.3 MPa, thereby to carry out slurry polymerization. Upon expiration of 180 minutes, the pressure was released, and the slurry was filtered, followed by drying to obtain 97 g of ultrahigh molecular weight ethylene-propylene copolymer particles (activity: 8,800 g/g catalyst). The physical properties of the obtained ultrahigh molecular weight ethylene-propylene copolymer particles are shown in Table 1.

Example 8

(1) Preparation of Organically Modified Clay and
(2) Preparation of Suspension of Polyethylene Production Catalyst were Carried Out in the Same Manner as in Example 6.

(3) Production of Ultrahigh Molecular Weight Polyethylene Particles

Into a 2-liter autoclave, 1.2 liters of hexane, 1.0 ml of 20% triisobutylaluminum and 87.7 mg (corresponding to 11.3 mg of solid content) of the suspension of the polyethylene production catalyst obtained in (2) were added and heated to 60° C., then a hydrogen/ethylene mixed gas containing 40 ppm of hydrogen, was supplied so that the partial pressure became 1.2 MPa, and thereafter, ethylene was continuously supplied so that the partial pressure became 1.3 MPa, thereby to carry out slurry polymerization of ethylene. Upon expiration of 180 minutes, the pressure was released, and the slurry was filtered, followed by drying to obtain 86 g of ultrahigh molecular weight ethylene homopolymer particles (activity: 7,600 g/g catalyst). The physical properties of the obtained ultrahigh molecular weight ethylene homopolymer particles are shown in Table 2.

Example 9

(1) Preparation of Organically Modified Clay

Carried out in the same manner as in Example 6.

(2) Preparation of Suspension of Polyethylene Production Catalyst

A 300 ml flask equipped with a thermometer and a reflux tube, was flushed with nitrogen, and then 25.0 g of the organically modified clay obtained in the above (1) and 108 ml of hexane were put therein. Then, 0.786 g of diphenylmethylene(cyclopentadienyl)(2,7-bis(diethylamino)-9-fluorenyl) hafnium dichloride, and 142 ml of 20% triisobutylaluminum were added, followed by stirring at 60° C. for 3 hours. After cooling to 45° C., the supernatant was decanted, followed by washing twice with 200 ml of hexane, and then, 200 ml of hexane was added to obtain a suspension of the polyethylene production catalyst (solid content: 11.6%).

(3) Production of Ultrahigh Molecular Weight Polyethylene Particles

Into a 2-liter autoclave, 1.2 liters of hexane, 1.0 ml of 20% triisobutylaluminum and 69.4 mg (corresponding to 8.1 mg of solid content) of the suspension of the polyethylene production catalyst obtained in the above (2) were added and heated to 60° C., and then, ethylene was continuously supplied so that the partial pressure became 1.3 MPa, thereby to carry out slurry polymerization of ethylene. Upon expiration of 180 minutes, the pressure was released, and the slurry was filtered, followed by drying to obtain 87 g of ultrahigh molecular weight ethylene homopolymer particles (activity: 10,800 g/g catalyst). The physical properties of the obtained ultrahigh molecular weight ethylene homopolymer particles are shown in Table 2.

Example 10

(1) Preparation of Organically Modified Clay and
(2) Preparation of Suspension of Polyethylene Production Catalyst were Carried Out in the Same Manner as in Example 9.
(3) Production of Ultrahigh Molecular Weight Polyethylene Particles Into a 2-liter autoclave, 1.2 liters of hexane, 1.0 ml of 20% triisobutylaluminum and 78.7 mg (corresponding to 9.1 mg of solid content) of the suspension of the polyethylene production catalyst obtained in the above (2) were added and heated to 60° C., then 20 g of propylene was added, and ethylene was continuously supplied so that the partial pressure became 1.3 MPa, thereby to carry out slurry polymerization. Upon expiration of 180 minutes, the pressure was released, and the slurry was filtered, followed by drying to obtain 105 g of ultrahigh molecular weight ethylene-propylene copolymer particles (activity: 11,500 g/g catalyst). The physical properties of the obtained ultrahigh molecular weight ethylene-propylene copolymer particles are shown in Table 2.

Example 11

(1) Preparation of Organically Modified Clay

Into a 1-liter flask, 300 ml of industrial alcohol (manufactured by Japan Alcohol Trading Co., Ltd., (trade name) Ekinen F-3) and 300 ml of distilled water were put, then 15.0 g of concentrated hydrochloric acid and 64.2 g (120 mmol) of dioleylmethylamine (manufactured by Lion Corporation, (trade name) Armin M20) were added and heated to 45° C., and 100 g of synthetic hectorite (manufactured by Rockwood Additives Ltd., (trade name) Laponite RDS) was dispersed, whereupon the temperature was raised to 60° C., and the mixture was stirred for 1 hour while maintaining the temperature. The slurry was filtered and then washed twice with 600 ml of water at 60° C., followed by drying in a dryer of 85° C. for 12 hours, to obtain 160 g of an organically modified clay. This organically modified clay was pulverized by a jet mill to bring the median diameter to be 15 μm.

(2) Preparation of Suspension of Polyethylene Production Catalyst

A 300 ml flask equipped with a thermometer and a reflux tube, was flushed with nitrogen, and then 25.0 g of the organically modified clay obtained in the above (1) and 108 ml of hexane were put therein. Then, 0.700 g of diphenyl-methylene(cyclopentadienyl)(2,7-bis(diethylamino)-9-fluorenyl)zirconium dichloride and 142 ml of 20% triisobutylaluminum were added, followed by stirring at 60° C. for 3 hours. After cooling to 45° C., the supernatant was decanted, followed by washing twice with 200 ml of hexane, and then, 200 ml of hexane was added to obtain a suspension of the polyethylene production catalyst (solid content: 13.2%).

(3) Production of Ultrahigh Molecular Weight Polyethylene Particles

Into a 2-liter autoclave, 1.2 liters of hexane, 1.0 ml of 20% triisobutylaluminum and 306.4 mg (corresponding to 40.4 mg of solid content) of the suspension of the polyethylene production catalyst obtained in the above (2) were added and heated to 50° C., and then, ethylene was continuously supplied so that the partial pressure became 1.1 MPa, thereby to carry out slurry polymerization of ethylene. Upon expiration of 180 minutes, the pressure was released, and the slurry was filtered, followed by drying to obtain 182 g of ultrahigh molecular weight ethylene homopolymer particles (activity: 4,500 g/g catalyst). The physical properties of the obtained ultrahigh molecular weight ethylene homopolymer particles are shown in Table 2.

Example 12

(1) Preparation of Organically Modified Clay

Carried out in the same manner as in Example 6.

(2) Preparation of Suspension of Polyethylene Production Catalyst

A 300 ml flask equipped with a thermometer and a reflux tube, was flushed with nitrogen, and then 25.0 g of the organically modified clay obtained in the above (1) and 108 ml of hexane were put therein. Then, 0.752 g of diphenyl-methylene(cyclopentadienyl)(2-(di-benzylamino)-9-fluorenyl) zirconium dichloride and 142 ml of 20% triisobutylaluminum were added, followed by stirring at 60° C. for 180 minutes. After cooling to 45° C., the supernatant was decanted, followed by washing twice with 200 ml of hexane, and then, 200 ml of hexane was added to obtain a suspension of the polyethylene production catalyst (solid content: 12.2%).

(3) Production of Ultrahigh Molecular Weight Polyethylene Particles

Into a 2-liter autoclave, 1.2 liters of hexane, 1.0 ml of 20% triisobutylaluminum and 301.5 mg (corresponding to 36.8 mg of solid content) of the suspension of the polyethylene production catalyst obtained in the above (2) were added and heated to 60° C., and then, ethylene was continuously supplied so that the partial pressure became 1.3 MPa, thereby to carry out slurry polymerization of ethylene. Upon expiration of 90 minutes, the pressure was released, and the slurry was filtered, followed by drying to obtain 103 g of ultrahigh molecular weight polyethylene particles (activity: 2,800 g/g catalyst). The physical properties of the obtained ultrahigh molecular weight polyethylene particles are shown in Table 2.

Example 13

(1) Preparation of Organically Modified Clay and
(2) Preparation of Suspension of Polyethylene Production Catalyst were Carried Out in the Same Manner as in Example 8.
(3) Production of Ultrahigh Molecular Weight Polyethylene Particles Into a 2-liter autoclave, 1.2 liters of hexane, 1.0 ml of 20% triisobutylaluminum and 358.6 mg (corresponding to 43.8 mg of solid content) of the suspension of the polyethylene production catalyst obtained in the above (2) were added and heated to 60° C., then a hydrogen/ethylene mixed gas containing 20 ppm of hydrogen was supplied so that the partial pressure became 1.2 MPa, and thereafter, ethylene was continuously supplied so that the partial pressure became 1.3 MPa, thereby to carry out slurry polymerization of ethylene. Upon expiration of 180 minutes, the pressure was released, and the slurry was filtered, followed by drying to obtain 105 g of ultrahigh molecular weight polyethylene particles (activity: 2,400 g/g catalyst). The physical properties of the obtained ultrahigh molecular weight polyethylene particles are shown in Table 2.

TABLE 1

| Examples | 1 | 2 | 3 | 4 | 5 | 6 | 7 |
|---|---|---|---|---|---|---|---|
| Intrinsic viscosity (dl/g) | 17.1 | 15.3 | 20.8 | 16.4 | 16.1 | 32 | 23 |
| Weight average molecular weight (×10$^6$) | 340 | 290 | 450 | 320 | 310 | 850 | 530 |
| Mw/Mn | 3.1 | 3.5 | 3.2 | 3.1 | 4.4 | 3.3 | 3.6 |
| Bulk density (kg/m$^3$) | 135 | 242 | 421 | 468 | 290 | 397 | 406 |
| Melting point in 1st scan (° C.) (Tm$_1$) | 144.1 | 141.2 | 144.7 | 140.6 | 135.0 | 144.9 | 142.8 |
| Melting point in 2nd scan (° C.) (Tm$_2$) | 132.1 | 129.5 | 132.2 | 128.7 | 123.3 | 131.8 | 130.2 |
| ΔTm (° C.) (=Tm$_1$ − Tm$_2$) | 12.0 | 11.7 | 12.5 | 11.9 | 11.7 | 13.1 | 12.6 |
| Tensile strength at break (MPa) | 53 | 51 | 56 | 52 | 38 | 62 | 56 |
| Right side of expression (a) | 48 | 45 | 48 | 44 | 36 | 48 | 46 |
| Right side of expression (c) | 89 | 84 | 89 | 82 | 72 | 89 | 85 |
| Breaking stress in melt-drawing (MPa) | 2.4 | 2.2 | 3.8 | 2.5 | 2.1 | 7.2 | 5.6 |
| Right side of expression (b) | 1.9 | 1.7 | 2.3 | 1.8 | 1.8 | 3.5 | 2.5 |
| Right side of expression (d) | 5.5 | 4.9 | 6.7 | 5.2 | 5.2 | 10.3 | 7.3 |
| Ti content (ppm) | 0 | 0 | 0 | 0 | 0 | 0 | 0 |
| Average particle diameter (μm) | 90 | 90 | 135 | 90 | 155 | 145 | 128 |
| Abrasion amount (mg) | 9 | 10 | 6 | 11 | 12 | 4 | 12 |

TABLE 2

| Examples | 8 | 9 | 10 | 11 | 12 | 13 |
|---|---|---|---|---|---|---|
| Intrinsic viscosity (dl/g) | 26 | 46 | 27 | 28 | 23 | 19.4 |
| Weight average molecular weight (×10$^6$) | 630 | Not measured | 660 | 700 | 530 | 400 |
| Mw/Mn | 3.4 | Not measured | 4.6 | 3.7 | 3.3 | 3.1 |
| Bulk density (kg/m$^3$) | 333 | 346 | 352 | 410 | 321 | 341 |
| Melting point in 1st scan (° C.) (Tm$_1$) | 144.6 | 145.1 | 137.2 | 144.2 | 145.2 | 144.5 |
| Melting point in 2nd scan (° C.) (Tm$_2$) | 132.5 | 131.7 | 124.5 | 132.9 | 133.1 | 132.5 |
| ΔTm (° C.) (=Tm$_1$ − Tm$_2$) | 12.1 | 13.4 | 12.7 | 11.3 | 12.1 | 12.0 |
| Tensile strength at break (MPa) | 58 | 66 | 42 | 58 | 57 | 56 |
| Right side of expression (a) | 49 | 48 | 38 | 49 | 50 | 49 |
| Right side of expression (c) | 90 | 88 | 74 | 91 | 91 | 90 |
| Breaking stress in melt-drawing (MPa) | 6.2 | 6.4 | 5.5 | 6.3 | 5.8 | 3.5 |
| Right side of expression (b) | 2.8 | 5.1 | 3.0 | 3.0 | 2.5 | 2.1 |
| Right side of expression (d) | 8.3 | 14.7 | 8.7 | 8.9 | 7.4 | 6.2 |
| Ti content (ppm) | 0 | 0 | 0 | 0 | 0 | 0 |
| Average particle diameter (μm) | 142 | 155 | 141 | 325 | 180 | 195 |
| Abrasion amount (mg) | 7 | 4 | 10 | 5 | 5 | 6 |

Comparative Example 1

(1) Preparation of Organically Modified Clay

Carried out in the same manner as in Example 1.

(2) Preparation of Suspension of Catalyst

A 300 ml flask equipped with a thermometer and a reflux tube, was flushed with nitrogen, and then 25.0 g of the organically modified clay obtained in the above (1) and 108 ml of hexane were put therein. Then, 0.292 g of bis(cyclopentadienyl)zirconium dichloride and 142 ml of 20% triisobutylaluminum were added, followed by stirring at 60° C. for 3 hours. After cooling to 45° C., the supernatant was decanted, followed by washing twice with 200 ml of hexane, and then, 200 ml of hexane was added to obtain a suspension of the catalyst (solid content: 11.8%).

(3) Production of Polyethylene Particles

Into a 2-liter autoclave, 1.2 liters of hexane, 1.0 ml of 20% triisobutylaluminum and 593.2 mg (corresponding to 70.0 mg of solid content) of the suspension of the catalyst obtained in the above (2) were added and heated to 30° C., and then, ethylene was continuously supplied so that the partial pressure became 1.6 MPa. Upon expiration of 90 minutes, the pressure was released, and the slurry was filtered, followed by drying to obtain 105 g of ethylene homopolymer particles (activity: 1,500 g/g catalyst). The physical properties of the obtained ethylene homopolymer particles are shown in Table 3.

The obtained ethylene homopolymer particles were such that the intrinsic viscosity was low, the melting point difference (ΔTm) between the 1st scan and 2nd scan was little (ΔTm=0.7° C.), and the tensile strength at break and abrasion resistance were also inferior. Further, melt drawing was attempted, but the sample was broken before it was drawn.

Comparative Example 2

(1) Preparation of Organically Modified Clay

Carried out in the same manner as in Example 1.

(2) Preparation of Suspension of Catalyst

A 300 ml flask equipped with a thermometer and a reflux tube, was flushed with nitrogen, and then 25.0 g of the organically modified clay obtained in the above (1) and 108 ml of hexane were put therein. Then, 0.669 g of diphenylmethylene(cyclopentadienyl)(2,7-di-t-butyl-9-fluorenyl)zirconium dichloride and 142 ml of 20% triisobutylaluminum were added, followed by stirring at 60° C. for 3 hours. After cooling to 45° C., the supernatant was decanted, followed by washing twice with 200 ml of hexane, and then, 200 ml of hexane was added to obtain a suspension of the catalyst (solid content: 12.3%).

(3) Production of Polyethylene Particles

Into a 2-liter autoclave, 1.2 liters of hexane, 1.0 ml of 20% triisobutylaluminum and 170.0 mg (corresponding to 20.9 mg of solid content) of the suspension of the catalyst obtained in the above (2) were added and heated to 30° C., and then, ethylene was continuously supplied so that the partial pressure became 1.6 MPa. Upon expiration of 90 minutes, the pressure was released, and the slurry was filtered, followed by drying to obtain 115 g of ethylene homopolymer particles (activity: 5,500 g/g catalyst). The physical properties of the obtained ethylene homopolymer particles are shown in Table 3.

The obtained ethylene homopolymer particles were such that the intrinsic viscosity was low, Tm$_1$ was also low, and thus, the tensile strength at break and abrasion resistance were inferior. Further, melt drawing was attempted, but the sample was broken before it was drawn.

Comparative Example 3

(1) Preparation of Solid Catalyst Component

Into a 1-liter glass flask equipped with a thermometer and a reflux tube, 50 g (2.1 mol) of magnesium metal powder and 210 g (0.62 mol) of titanium tetrabutoxide were put, 320 g (4.3 moles) of n-butanol having 2.5 g of iodine dissolved therein, was added at 90° C. over a period of 2 hours, and further, while eliminating hydrogen gas generated, stirring was continued under nitrogen sealing for 2 hours at 140° C., to obtain a uniform solution. Then, 2,100 ml of hexane was added.

90 g (corresponding to 0.095 mol of magnesium) of the obtained solution was put in a 500 ml glass flask separately prepared, and diluted with 59 ml of hexane. Then, 106 ml of a hexane solution containing 0.29 mol of isobutyl aluminum dichloride, was added dropwise at 45° C. over a period of 2 hours, followed by further stirring for 1 hour at 70° C., to obtain a solid catalyst component. By means of hexane, remaining unreacted substances and byproducts were removed by a decantation method, whereupon the composition was analyzed whereby the titanium content was 8.6%.

(2) Production of Polyethylene Particles

Into a 2-liter autoclave, 1.2 liters of hexane, 1.0 ml of 20% triisobutylaluminum and 4.2 mg of the solid catalyst component obtained in the above (1), were added and heated to 80° C., whereupon ethylene was continuously supplied so that the partial pressure became 0.6 MPa. Upon expiration of 90 minutes, the pressure was released, and the slurry was filtered, followed by drying, to obtain 180 g of ethylene homopolymer particles (activity: 43,000 g/g catalyst). The physical properties of the obtained ethylene homopolymer particles are shown in Table 3.

The obtained ethylene homopolymer particles were such that the melting point difference ($\Delta Tm$) between the 1st scan and 2nd scan was small, and the tensile strength at break, breaking strength in melt drawing, and abrasion resistance, were inferior during melt stretching. Further, when formed into a molded product, yellowing was observed, and there were problems also in moldability and product quality.

Comparative Example 4

With respect to a commercially available polyethylene (manufactured by Mitsui Chemicals, Inc., trade name: Hizex Million Grade 240M), physical properties were evaluated in the same manner as in Examples. The results are shown in Table 3.

The melting point difference ($\Delta Tm$) between the 1st scan and 2nd scan was small, and the tensile strength at break, breaking strength in melt drawing, and abrasion resistance, were inferior. Further, when formed into a molded product, yellowing was observed, and there were problems also in moldability and product quality.

TABLE 3

|  | Comparative Examples ||||
| --- | --- | --- | --- | --- |
|  | 1 | 2 | 3 | 4 |
| Intrinsic viscosity (dl/g) | 1.5 | 8.3 | 15.2 | 12.2 |
| Weight average molecular weight ($\times 10^6$) | 10 | 120 | 290 | 200 |
| Mw/Mn | 2.8 | 3.4 | 6.5 | 8.4 |
| Bulk density (kg/m$^3$) | 250 | 350 | 260 | 425 |
| Melting point in 1st scan (° C.) (Tm$_1$) | 135.3 | 139.7 | 139.6 | 139.5 |
| Melting point in 2nd scan (° C.) (Tm$_2$) | 134.6 | 132.3 | 132.9 | 130.7 |
| $\Delta Tm$ (° C.) (=Tm$_1$ − Tm$_2$) | 0.7 | 7.4 | 6.7 | 8.8 |
| Tensile strength at break (MPa) | 42 | 43 | 44 | 43 |
| Right side of expression (a) | 52 | 49 | 49 | 46 |
| Right side of expression (c) | 94 | 90 | 91 | 86 |
| Breaking stress in melt-drawing (MPa) | — | — | 1.4 | 1.0 |
| Right side of expression (b) | 0.2 | 0.9 | 1.7 | 1.3 |
| Right side of expression (d) | 0.5 | 2.7 | 4.9 | 3.9 |
| Ti content (ppm) | 0 | 0 | 2.0 | 0.8 |
| Average particle diameter (μm) | 230 | 170 | 200 | 151 |
| Abrasion amount (mg) | 45 | 25 | 18 | 21 |

INDUSTRIAL APPLICABILITY

The ultrahigh molecular weight polyethylene particles of the present invention have a high melting point and high crystallinity, and a molded product formed by using them, is excellent in mechanical strength, thermal resistance, abrasion resistance, etc. and thus is useful as lining material, a line component in food industry, a mechanical component, an artificial joint component, a sports good, a microporous membrane, a net, rope, a glove, etc.

The entire disclosures of Japanese Patent Application No. 2013-144940 filed on Jul. 10, 2013 and Japanese Patent Application No. 2014-118459 filed on Jun. 9, 2014 including specifications, claims and summaries are incorporated herein by reference in their entireties.

The invention claimed is:

1. Ultrahigh molecular weight polyethylene particles having:
    an intrinsic viscosity ($\eta$) being at least 15 dL/g and at most 60 dL/g,
    a bulk density being at least 130 kg/m$^3$ and at most 700 kg/m$^3$,
    a difference between Tm$_1$ and Tm$_2$ (i.e. $\Delta Tm = Tm_1 - Tm_2$) being at least 11° C. and at most 30° C., where Tm$_1$ is a melting point (Tm$_1$) in 1st scan measured by a differential scanning calorimeter (DSC) at the time when the temperature is raised from 0° C. to 230° C. at a temperature raising rate of 10° C./min (1st scan), and Tm$_2$ is a melting point (Tm$_2$) in 2nd scan measured by DSC at the time when, then, after being left to stand for 5 minutes, lowering the temperature to −20° C. at a temperature lowering rate of 10° C./min and then being left to stand for 5 minutes, the temperature is again raised from −20° C. to 230° C. at a temperature raising rate of 10° C./min (2nd scan),
    a content of titanium is less than 0.2 ppm, and
    a molecular weight distribution (Mw/Mn) is larger than 3 and less than 6.

2. The ultrahigh molecular weight polyethylene particles according to claim 1, wherein a content of titanium is less than 0.1 ppm.

3. The ultrahigh molecular weight polyethylene particles according to claim 1, wherein a tensile strength at break (TS (MPa)) of a sheet molded as cooled at a mold temperature lower by from 10 to 30° C. than the melting point (Tm$_2$) in 2nd scan measured by the above, after heat compression with a pressing pressure of 20 MPa at a pressing temperature 190° C., satisfies the following relational expression (a):

$$TS \geq 1.35 \times Tm_2 - 130 \qquad (a).$$

4. The ultrahigh molecular weight polyethylene particles according to claim 1, wherein a breaking strength (MTS (MPa)) at the time when a heat compression molded sheet is melt-drawn at a temperature higher by 20° C. than the melting point (Tm$_2$) in 2nd scan measured by the above, is at least 2 MPa.

5. The ultrahigh molecular weight polyethylene particles according to claim 1, wherein a breaking strength (MTS (MPa)) at the time of being melt-drawn, as measured in the above, and the intrinsic viscosity ($\eta$), satisfy the following relational expression (b):

$$MTS \geq 0.11 \times \eta \qquad (b).$$

6. The ultrahigh molecular weight polyethylene particles according to claim 1, wherein an average particle diameter is at least 1 μm and at most 1,000 μm.

7. The ultrahigh molecular weight polyethylene particles according to claim 1, wherein a molecular weight distribution (Mw/Mn) is larger than 3 and less than 5.

8. The ultrahigh molecular weight polyethylene particles according to claim 1, which are obtained by homopolymerization of ethylene or by copolymerization of ethylene and an α-olefin.

9. The ultrahigh molecular weight polyethylene particles according to claim 8, wherein the α-olefin is propylene, 1-butene, 4-methyl-1-pentene, 1-hexene or 1-octene.

10. The ultrahigh molecular weight polyethylene particles according to claim 1, which are obtained by a slurry polymerization method.

11. The ultrahigh molecular weight polyethylene particles according to claim 8, which are obtained by polymerization in the presence of a metallocene catalyst.

12. The ultrahigh molecular weight polyethylene particles according to claim 11, wherein the metallocene catalyst is obtained from a transition metal compound (A), an organically modified clay (B) which is modified by an aliphatic salt, and an organic aluminum compound (C).

13. A molded product obtained from the ultrahigh molecular weight polyethylene particles as defined in claim 1.

\* \* \* \* \*